United States Patent Office.

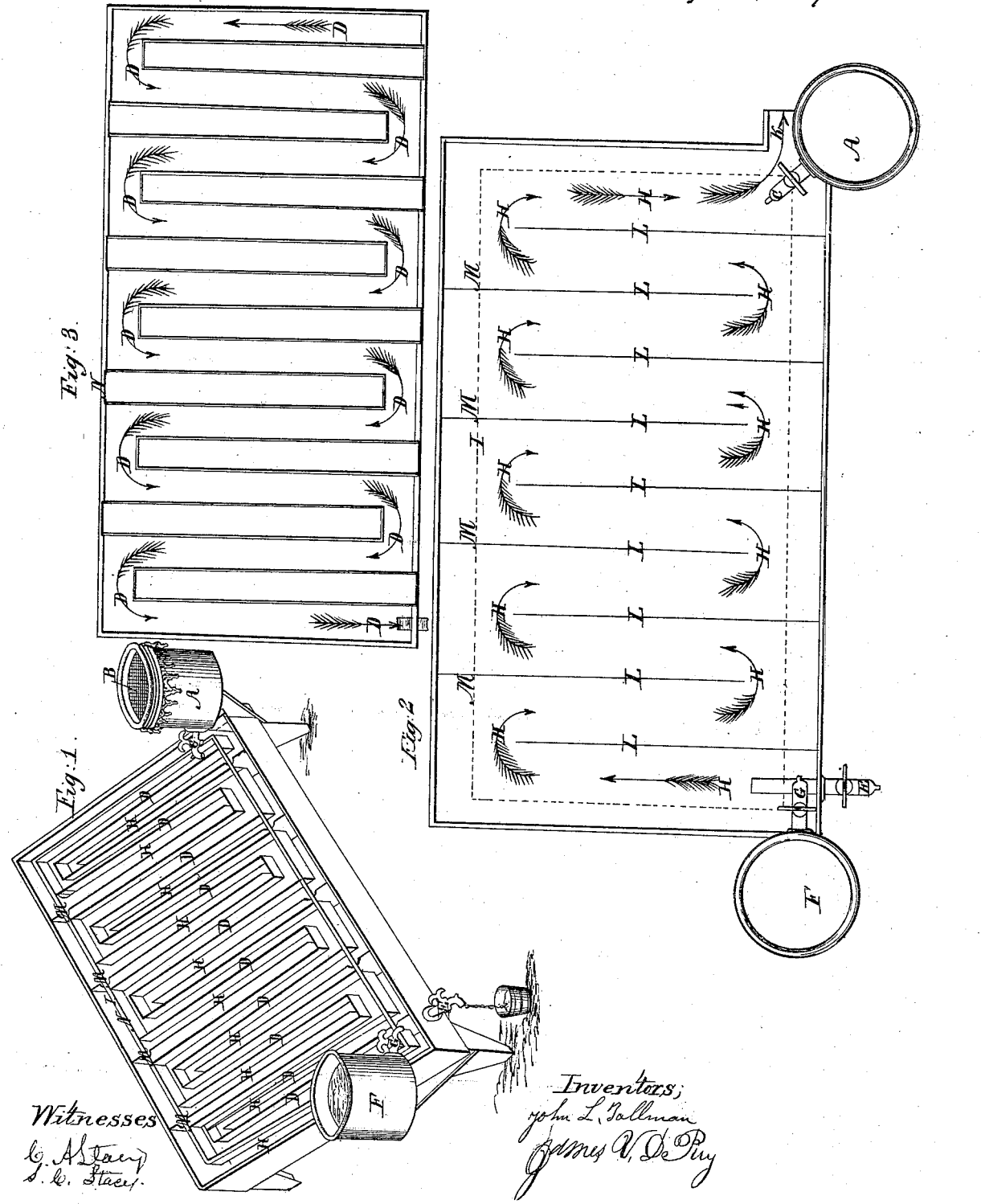

JOHN L. TALLMAN AND JAMES V. DE PUY, OF TECUMSEH, MICHIGAN.

Letters Patent No. 88,677, dated April 6, 1869.

IMPROVEMENT IN APPARATUS FOR COOLING MILK.

The Schedule referred to in these Letters Patent and making part of the same

Be it known that we, JOHN L. TALLMAN and JAMES V. DE PUY, of Tecumseh, Lenawee county, and State of Michigan, have invented a new and useful Machine for Cooling Milk, which we call "A Milk-Cooler;" and we do hereby declare that the following is a full, clear, and exact description of the construction and operation of the same, reference being had to the annexed drawings, making a part of this specification, in which—

Figure 1 is a perspective view of the whole machine

Figure 2 represents the water-current and channel, with milk and water-vessels attached.

Figure 3 represents the milk-channel, showing the open current of milk.

To enable others to understand our invention, we make the following particular description:

Fig. 1 represents the apparatus entire.

This consists of two principal parts: first, a vessel, or box, of wood, or metal, or stone, with a bar, or slat placed on one side, and passing across nearly to the other side of the vessel, or box; and, next, a bar, fastened on the opposite side of the box, or vessel, and passing nearly to the opposite side, and these bars placed often enough, so as to make a continuous passage for the water from one end of the box, or vessel to the other, passing across the box, or vessel from one side to the other, substantially as shown in said drawing, the water being received at one end, and passing across from side to side, until it reaches the other end of the box, or vessel, and then passing out through the waste-pipe.

On this box, or vessel rests another box, or vessel, similarly formed by transverse bars, to make a channel for the milk, the passage so arranged as to make square corners for the milk to strike in its passage along the channel, and across the vessel from side to side.

This vessel, with its channel so formed, rests in the vessel of water, or other cool fluid, so as to be covered on its bottom and on the sides of each channel with the water, or other cool fluid in the lower vessel passing against the sides and bottom of the upper vessel, as represented in the drawings, leaving the top of the milk-channel open, for the escape of the animal heat and odor contained in the milk, and producing the effect of a rapid cooling of the milk, and freeing it from animal odor and heat.

Fig. 2 represents the lower or water-channel, with milk and water-vessels attached at opposite ends, showing the current of ice-water, or other cooling-fluid from the water-vessel F flowing under and on either side of the milk-conduit, or channel D, and discharging from the water-spout K.

This water-channel, and the milk and water-vessels may be made of wood, or of any suitable metal, or of stone.

Fig. 3 represents the milk-channel D, showing the open current of milk enclosed on the bottom and sides by the water-current, and flowing in the opposite direction from the water-current, and discharging at the faucet E.

This channel may be made of wood, or any metal.

Figure 4 represents a side view of a ring in the milk-vessel A, holding the strainer B.

Figure 5 represents a top view of said ring.

A represents, in all the figures, the milk-channel.

B, the strainer.

C, faucet to the milk-vessel.

D, channel for milk, and the arrows the course of the milk-current.

E, faucet, discharging milk from channel D.

F, water-vessel.

G, faucet to water-vessel.

H, channel for counter-current of ice-water about the milk-channel.

I, dotted lines, showing the position of the wire N in the milk-channel when placed for use.

K, spout, for discharging water.

L, bar, to direct the water-current.

M, a notch in each bar, to receive the rail, or wire N, and hold it in the position indicated by the dotted lines.

N, wire, or rail on the side of the milk-conduit, or channel, stiffening it and holding it in place.

We do not broadly claim cooling milk by running a current of water in contact with a vessel containing a current of milk running in a direction opposite to the water-current, as we are aware that that has already been done, and is seen in the patent of J. O. Moore, July 31, 1866, for apparatus for cooling milk; but What we do claim as our invention, and desire to secure by Letters Patent, is—

A machine for cooling milk, or other liquids, by the combination of a vessel or vessels causing a current of milk to run in one direction immersed in a vessel or vessels filled with water, or other fluid, the water coming in contact with the milk-vessel on the bottom and sides, and causing the current of water, or other fluid to run in a direction opposite to the milk-current, both vessels being placed in a horizontal position, with the milk and water-currents running in a horizontal direction, and with the upper surface of the milk-vessel open, so as to expose the milk to the action of the atmosphere, by means of the particular combination and devices fully set forth in the specifications and drawings.

JOHN L. TALLMAN.
JAMES V. DE PUY.

Witnesses:
S. C. STACY,
S. M. MIDGET.